(12) United States Patent
Faibish et al.

(10) Patent No.: US 9,960,973 B1
(45) Date of Patent: May 1, 2018

(54) MULTI-TIER STORAGE SYSTEM HAVING A FRONT-END STORAGE TIER FACILITATING EFFICIENT GRAPH ANALYTICS COMPUTATIONS

(71) Applicant: EMC Corporation, Hopkinton, MA (US)

(72) Inventors: Sorin Faibish, Newton, MA (US); John M. Bent, Los Alamos, NM (US); Dennis Ting, Groton, MA (US); Sassan Teymouri, Saratoga, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 267 days.

(21) Appl. No.: 14/977,960

(22) Filed: Dec. 22, 2015

(51) Int. Cl.
*G06F 3/06* (2006.01)
*H04L 12/26* (2006.01)
*H04L 29/08* (2006.01)

(52) U.S. Cl.
CPC .............. *H04L 43/04* (2013.01); *G06F 3/061* (2013.01); *G06F 3/0601* (2013.01); *G06F 3/0607* (2013.01); *G06F 3/067* (2013.01); *G06F 3/0635* (2013.01); *G06F 3/0653* (2013.01); *G06F 3/0685* (2013.01); *H04L 43/08* (2013.01); *H04L 67/1097* (2013.01)

(58) Field of Classification Search
CPC .......... G06F 12/0223; G06F 17/30067; G06F 17/30088; G06F 17/30315; G06F 3/0604; G06F 3/0655; G06F 3/065; G06F 3/0601; G06F 3/0607; G06F 3/061; G06F 3/0635; G06F 3/0653; G06F 3/067; G06F 3/0685; G06Q 10/06; H04L 29/0899; H04L 67/1008; H04L 43/04; H04L 43/08; H04L 67/1097

See application file for complete search history.

(56) References Cited

U.S. PATENT DOCUMENTS

| | | | |
|---|---|---|---|
| 7,877,511 B1 * | 1/2011 | Berger | G06F 17/30067 709/201 |
| 8,392,372 B2 * | 3/2013 | Ferguson | G06F 17/30088 707/649 |

(Continued)

OTHER PUBLICATIONS

"EMC 2 Tiers Solution Prototype," http://veddiew.typepad.com/blog/2015/05/emc-two-tiers-storage-solution-prototype.html, Sep. 25, 2015, 2 pages.

(Continued)

*Primary Examiner* — Le H Luu
(74) *Attorney, Agent, or Firm* — Ryan, Mason & Lewis, LLP

(57) ABSTRACT

An apparatus in one embodiment comprises a multi-tier storage system and at least one dispatcher node. The multi-tier storage system comprises at least a front-end storage tier and a back-end storage tier. The at least one dispatcher node is configured to load portions of graph data from the front-end storage tier and the back-end storage tier for graph analytics computations performed at respective ones of a plurality of compute nodes configured for communication with the storage system over at least one network. The multi-tier storage system configured to switch logical connections of respective ones of the compute nodes to the at least one dispatcher node based on progress of graph analytics computations at the compute nodes.

20 Claims, 9 Drawing Sheets

(56) References Cited

U.S. PATENT DOCUMENTS

| | | | | |
|---|---|---|---|---|
| 8,417,681 | B1* | 4/2013 | Miloushev | G06F 17/30067 707/704 |
| 2012/0029975 | A1* | 2/2012 | Bisel | G06Q 10/06 705/7.37 |
| 2013/0198449 | A1* | 8/2013 | Belluomini | G06F 3/0604 711/114 |
| 2013/0227194 | A1 | 8/2013 | Kannan et al. | |
| 2013/0346724 | A1* | 12/2013 | Ranade | G06F 12/0223 711/173 |
| 2014/0156846 | A1* | 6/2014 | Stern | H04L 29/0899 709/226 |
| 2014/0351537 | A1* | 11/2014 | Chen | G06F 3/065 711/162 |
| 2015/0186047 | A1* | 7/2015 | Shank | G06F 3/0655 711/103 |
| 2015/0326656 | A1* | 11/2015 | Guo | H04L 67/1008 709/226 |
| 2015/0363443 | A1* | 12/2015 | Kaushik | G06F 17/30315 707/723 |
| 2017/0177224 | A1* | 6/2017 | Glover | G06F 3/0604 |

OTHER PUBLICATIONS

EMC Corporation, "EMC Tiered Storage for SAP: a New Way to Optimize with Use Cases for EMC Symmetrix VMAX with FAST and Virtual LUN," White Paper, Applied Technology, May 2010, 14 pages.

EMC Corporation, "EMC ScaleIO," V1.32, User Guide, #302-001-033, Rev. 11, May 2015, 536 pages.

EMC Corporation, "EMC 2-Tiers—POSIX Namespace for 2nd and 3rd Platform Storage Systems," Dec. 2015, 3 pages.

J. Hilland et al., "RDMA Protocol Verbs Specification (Version 1.0)," draft-hillard-iwarp-verbs-v1.0, Apr. 2003, 243 pages.

EMC Corporation, "EMC Elastic Cloud Storage—Software-Defined Object Storage—Cloud-Scale Capabilities and Economics," EMC Data Sheet, Oct. 2015, 4 pages.

EMC Corporation, "EMC ATMOS Cloud Storage—A Platform to Store, Archive, and Access Unstructured Data at Scale—Data, Application, Access Demands," EMC Data Sheet, Sep. 2014, 3 pages.

EMC Corporation, "Technical White Paper: Elastic Cloud Storage Software Atchitecture—Deploy a Modern Hyperscale Storage Platform on Commodity Infrastructure," EMC White Paper, Feb. 2015, 12 pages.

EMC Corporation, "EMC SCALEIO Operation Overview—Ensuring Non-Disruptive Operation and Upgrade," EMC White Paper, Mar. 2015, 10 pages.

U.S. Appl. No. 14/871,160 filed in the name of S. Faibish et al. on Sep. 30, 2015 and entitled "Translation-Based Name Node Configuration for Object Access in a Multi-Tier Storage System."

Adam Moody, "Overview of the Scalable Checkpoint / Restart (SCR) Library," S&T Principal Directorate—Computation Directorate, Oct. 14, 2009, 33 pages.

* cited by examiner

MULTI-TIER STORAGE SYSTEM HAVING A FRONT-END STORAGE TIER FACILITATING EFFICIENT GRAPH ANALYTICS COMPUTATIONS

FIELD

The field relates generally to information processing systems, and more particularly to storage in information processing systems.

BACKGROUND

Storage systems are often configured to include multiple storage tiers, with different ones of the tiers providing different levels of input-output (TO) performance or other characteristics.

In such systems, data may be moved from one tier to another within a given storage system based on access frequency of the data or other factors.

These and other types of storage systems may incorporate one or more object stores. In an object store, data is exposed and managed in the form of objects instead of files or blocks. Different objects can include different amounts and types of unstructured data but each object is identified by a globally unique identifier. Objects can therefore be stored in a flat address space such as a storage pool. The unique identifier of a given object allows an application or other requesting entity to retrieve that object without needing to know the physical location in which the object is stored. Accordingly, object stores abstract away complexities associated with lower level storage functions. Object stores are commonly utilized in cloud storage environments and numerous other storage applications.

Despite the advantages associated with storage tiering and object stores, additional improvements are needed in terms of data access performance and scalability, particularly for storage implemented in information processing systems that include potentially large numbers of compute nodes.

SUMMARY

Illustrative embodiments of the present invention provide information processing systems that include multi-tier storage systems in which a front-end storage tier facilitates efficient graph analytics computations.

In one embodiment, an apparatus comprises a multi-tier storage system and at least one dispatcher node. The multi-tier storage system comprises at least a front-end storage tier and a back-end storage tier. The at least one dispatcher node is configured to load portions of graph data from the front-end storage tier and the back-end storage tier for graph analytics computations performed at respective ones of a plurality of compute nodes configured for communication with the storage system over at least one network. The multi-tier storage system configured to switch logical connections of respective ones of the compute nodes to the at least one dispatcher node based on progress of graph analytics computations at the compute nodes.

In an illustrative embodiment, the at least one dispatcher node comprises an IO dispatcher node.

In some embodiments, the front-end storage tier comprises a fast tier in a 2 TIERS™ storage system, although other types of multi-tier storage systems can be used in other embodiments.

These and other illustrative embodiments include, without limitation, apparatus, systems, methods and processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

Figure 1:
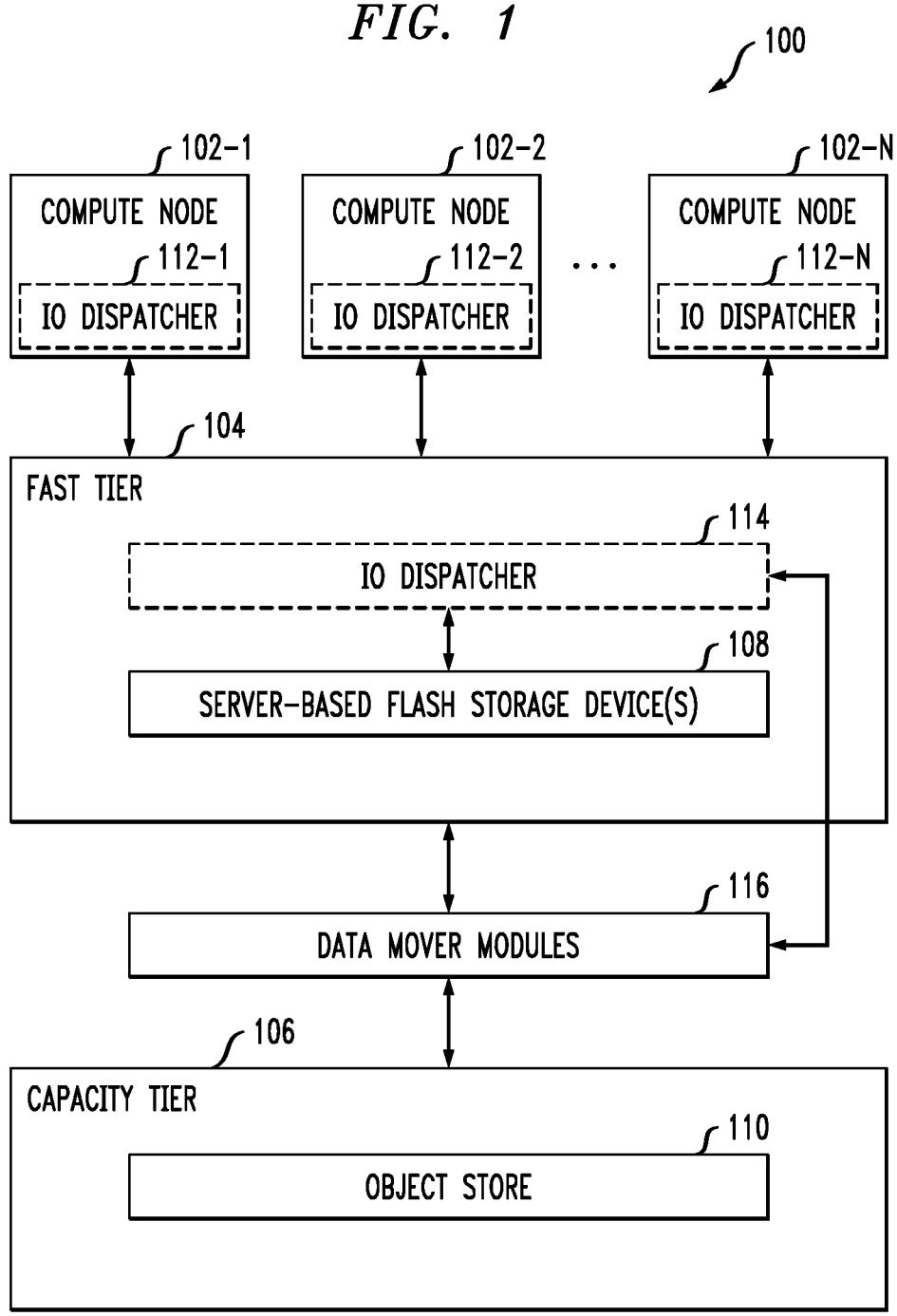
FIG. 1 is a block diagram of an information processing system comprising a multi-tier storage system in which a front-end storage tier facilitates efficient graph analytics computations in an illustrative embodiment of the invention.

FIG. 1 shows an information processing system 100 configured in accordance with an illustrative embodiment of the present invention. The information processing system 100 comprises compute nodes 102-1, 102-2, . . . 102-N collectively referred to herein as compute nodes 102, and a multi-tier storage system including fast tier 104 and capacity tier 106. Although not explicitly shown in FIG. 1, each of the compute nodes 102 may comprise a processor coupled to a memory.

The fast tier 104 is an example of what is more generally referred to herein as a "front-end storage tier" of the multi-tier storage system, while the capacity tier 106 is an example of what is more generally referred to herein as a "back-end storage tier" of the multi-tier storage system. Other types of front-end and back-end storage tiers can be used in other embodiments. The compute nodes 102 may be configured for communication with the fast tier 104 and capacity tier 106 over at least one network, although such networks are not explicitly shown in FIG. 1.

The fast tier 104 is shown in FIG. 1 as including server-based flash storage devices 108, while the capacity tier 106 is shown as including object store 110. The server-based flash storage devices 108 and object store 110 will be described in further detail below.

The compute nodes 102 in some embodiments comprise respective analysis nodes that run respective analytics applications utilizing data stored in the fast tier 104 and one or more other tiers of the multi-tier storage system. Numerous other types of compute nodes can be used in other embodiments, including various combinations of multiple compute nodes of different types. For example, at least a subset of the compute nodes 102 in some implementations can comprise virtual machines or containers running in cloud infrastructure.

The compute nodes 102 and fast tier 104 in some embodiments incorporate or otherwise support analytics functionality. For example, the compute nodes 102 and/or fast tier 104 may comprise an in-memory database analytics engine such as SAP HANA that comprises a relational database management system.

The analytics functionality can alternatively be provided using in-memory data analytics products such as Tachyon. Numerous other types of analytics functionality can be provided using the compute nodes 102 and fast tier 104 in other embodiments.

The compute nodes 102 in the present embodiment are assumed to be interconnected with one another using high-speed connections. For example, data can be moved between the compute nodes 102 using remote direct memory access (RDMA) connections over InfiniBand or Gigabit Ethernet. Numerous other types of connections and associated data transfer protocols can be used in other embodiments.

In FIG. 1, the compute nodes 102 are shown as including respective input/output (IO) dispatchers 112. The fast tier 104 is also shown as including an IO dispatcher 114. Embodiments, however, are not limited to arrangements in which both the compute nodes 102 and the fast tier 104 implement respective IO dispatchers. Thus, FIG. 1 shows the IO dispatchers 112 and 114 in dashed outlines to indicate that embodiments do not necessarily require the use of both IO dispatchers 112 and IO dispatcher 114. In some embodiments, one or more of the compute nodes 102 may not include a respective IO dispatcher 112. Similarly, in some embodiments the fast tier 104 may not include IO dispatcher 114. IO dispatchers 112 and 114, also referred to herein as IODs or dispatcher nodes, coordinate the movement of data between fast tier 104 and capacity tier 106 for efficient graph analytics computations at the compute nodes 102 and/or fast tier 104.

The storage system in the FIG. 1 embodiment further comprises data mover modules 116. The data mover modules 116 are illustratively configured to move data between the fast tier 104 and the capacity tier 106. The capacity tier 106 illustratively comprises an object store 110, although in other embodiments could comprise a plurality of different object stores, or other types of storage. The object store 110 is configured to store data in the form of objects having respective object identifiers (OIDs).

It should be noted that software-defined storage may also be used for the object store 110 or other portions of the capacity tier 106. Examples of software-defined storage products include ScaleIO™ and ViPR® both of which are commercially available from EMC Corporation of Hopkinton, Mass.

For example, implementations utilizing ScaleIO™ for software-defined storage can advantageously support hundreds or thousands of compute nodes, potentially providing a single memory pool with a capacity on the order of a petabyte (PB). Such an arrangement overcomes scalability limitations inherent in certain conventional systems used to implement in-memory data analytics functionality with SAP HANA or Tachyon. Also, failure protection functionality provided by ScaleIO™ can be used to protect memory data blocks in flash storage of fast tier 104.

Additional details regarding ScaleIO™ functionality that can be incorporated into a capacity tier in illustrative embodiments can be found in, for example, EMC ScaleIO™ User Guide, V1.32, Document No. 302-001-033, Rev. 11, May 2015, which is incorporated by reference herein.

The fast tier 104, capacity tier 106, IO dispatchers 112, IO dispatcher 114, and data mover modules 116 are all assumed to be part of the multi-tier storage system of information processing system 100, although other arrangements are possible in other embodiments. Also, it should be noted that components such as the data mover modules 116 that are shown as separate from the fast tier 104 and capacity tier 106 in the FIG. 1 embodiment can be implemented at least in part within at least one of the tiers. For example, as will be described elsewhere herein, the IO dispatchers 112 and 114 can be implemented in a distributed manner using the compute nodes 102 or associated IO nodes that are separate from those compute nodes. The data mover modules 116 can similarly be implemented in a distributed manner.

A given "IO node" as the term is used herein is intended to encompass a data node, a metadata node, or another type of node providing access to at least one of data and metadata for one or more associated compute nodes. The term "compute node" is also intended to be broadly construed, and generally encompasses a system node that runs at least a portion of at least one application.

It is assumed that the fast tier 104 has a relatively high input-output processing speed and a relatively low capacity and the capacity tier 106 has a relatively low input-output processing speed and a relatively high capacity, although other types of multi-tier storage systems can be used in other embodiments.

A data mover module is illustratively coupled to the storage tiers and configured to control transfer of data between the storage tiers. The term "data movement" as used in this and other contexts herein is intended to be broadly construed, so as to encompass data migration as well as other types of movement of data between storage tiers. A given data mover module can be implemented at least in part on storage arrays or other storage platforms that implement at least portions of one or more of the storage tiers of the multi-tier storage system.

Each of at least a subset of the storage tiers of a multi-tier storage system comprises a plurality of storage drives with different types of storage drives being used in different ones of the storage tiers. For example, a fast tier may comprise flash drives while a capacity tier comprises disk drives. The particular storage drives used in a given storage tier may be varied in other embodiments, and multiple distinct storage drive types may be used within a single storage tier. The term "storage drive" as used herein is intended to be broadly construed, so as to encompass, for example, disk drives, flash drives, solid state drives, hybrid drives or other types of storage products and devices.

The storage drives utilized in the fast tier 104, such as the server-based flash storage devices 108, are generally significantly faster in terms of read and write access times than the drives utilized in a capacity tier. Accordingly, the fast tier 104 in some embodiments is a relatively small storage tier optimized for IO processing speed, while the capacity tier 106 is a relatively large but slower storage tier optimized for storage capacity. Terms such as "fast" and "slow" in this context are relative terms and not intended to denote any particular absolute performance level. However, numerous alternative tiering arrangements may be used, including arrangements with three or more tiers each providing a different level of performance. Also, the various tiers of a given multi-tier storage system in other embodiments need not be arranged as respective front-end and back-end storage tiers. Accordingly, numerous alternative storage tiering arrangements can be used in other embodiments. Such alternative arrangements can include, for example, one or more intermediate storage tiers arranged between the front-end and back-end storage tiers of a multi-tier storage system.

The term "multi-tier storage system" as used herein is therefore intended to be broadly construed so as to encompass any of a wide variety of different arrangements of storage tiers. The term "storage tier" as used herein is also intended to be broadly construed, and may comprise, for example, a single storage array or a single-tier storage system.

In some embodiments, the fast tier 104 and the capacity tier 106 of the multi-tier storage system are implemented in the form of a 2 TIERS™ storage system from EMC Corporation of Hopkinton, Mass.

By way of example, a given 2 TIERS™ storage system may comprise fast tier 104 implemented using DSSD™ server-based flash storage devices, also from EMC Corporation, and capacity tier 106 comprising object store 110. DSSD™ server-based flash storage devices are examples of the server-based flash storage devices 108 shown in FIG. 1. In such an arrangement, an IO dispatcher software layer of the 2 TIERS™ storage system may be configured, for example, to pre-fetch data from one or more of the object stores 110 of the capacity tier 106 into the DSSD™ storage devices of the fast tier 104. The IO dispatchers 112 and 114 may implement the IO dispatcher software layer of the 2 TIERS™ storage system.

It should be noted that access predictions or other hints provided using analytics applications associated with in-memory data analytics products such as Tachyon can be utilized by the IO dispatcher software layer of the 2 TIERS™ storage system to provide the fastest possible access to needed data files.

A wide variety of other types of server-based flash storage devices and multi-tier storage systems can be used in other embodiments, as will be apparent to those skilled in the art. References herein to DSSD™ storage devices and the 2 TIERS™ storage system are by way of example only.

The data mover modules 116 may be configured to control movement of data between fast tier 104 and the capacity tier 106 in order to facilitate achievement of desired levels of performance by system users.

The "users" in this embodiment may refer, for example, to respective ones of the compute nodes 102, although the term "user" as utilized herein is intended to be broadly construed so as to encompass numerous other arrangements of human, hardware, software or firmware entities, as well as combinations of such entities.

The data mover modules 116 can communicate with the compute nodes 102, fast tier 104 and capacity tier 106 via one or more networks or other types of communication media. In distributed implementations, different modules or other portions of a given distributed system component such as IO dispatchers 112 and 114 or data mover modules 116 can be implemented in respective ones of the compute nodes 102 or associated IO nodes that are separate from those compute nodes.

As noted above, the compute nodes 102 are assumed to communicate with the storage system over at least one network, which is not explicitly shown in the figure. The compute nodes 102 may comprise respective computers in a cluster of computers associated with a supercomputer or other high performance computing (HPC) system. The term "compute node" as used herein is intended to be broadly construed, and such nodes in some embodiments may comprise respective analysis nodes or other types of compute nodes. Applications running on such nodes illustratively include what are referred to herein as "analysis applications" but such applications are also intended to be broadly construed.

As indicated previously, it is possible to implement IO dispatchers in a distributed manner, with portions of an IO dispatcher possibly being implemented on the fast tier 104 (e.g., IO dispatcher 114) and respective ones of the compute nodes 102 (e.g., IO dispatchers 112) or associated processing platforms. Other types of distributed implementations of IO dispatchers are possible. For example, at least a subset of the functionality of IO dispatchers can be implemented on respective IO nodes that are associated with but separate from the compute nodes 102 and fast tier 104. The data mover modules 116 can similarly be implemented in a distributed manner, possibly using the same compute or IO nodes that are used to implement respective portions of the IO dispatchers 112 and 114. The IO nodes may illustratively comprise respective servers.

It is to be appreciated that these and other features of illustrative embodiments are presented by way of example only, and should not be construed as limiting in any way.

Accordingly, different numbers, types and arrangements of compute nodes, storage tiers, IO dispatchers and data mover modules can be used in other embodiments.

The fast tier 104, capacity tier 106, IO dispatchers 112 and 114, data mover modules 116 and possibly other elements of the system 100 can be implemented using one or more storage platforms. For example, a given storage platform can comprise any of a variety of different types of storage including network-attached storage (NAS), storage area networks (SANs), direct-attached storage (DAS) and distributed DAS, as well as combinations of these and other storage types, including software-defined storage.

A given storage platform may comprise storage arrays such as VNX® and Symmetrix VMAX® storage arrays, both commercially available from EMC Corporation. Other types of storage products that can be used in implementing a given storage platform in an illustrative embodiment include the previously-mentioned software-defined storage products such as ScaleIO™ and ViPR®, and server-based flash storage devices such as DSSD™, as well as cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage platform in an illustrative embodiment.

These and other storage platforms can be part of what is more generally referred to herein as a processing platform comprising one or more processing devices each comprising a processor coupled to a memory, and the processing device may be implemented at least in part utilizing one or more virtual machines or other types of virtualization infrastructure such as Docker containers or other types of Linux containers (LXCs). The IO dispatchers 112 and 114, data mover modules 116, as well as other system components, may be implemented at least in part using processing devices of such processing platforms.

For example, in a distributed implementation of the IO dispatchers 112 and 114, the IO dispatchers 112 and 114 may be implemented in respective LXCs running on respective ones of the compute nodes or associated IO nodes.

Communication between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of FIG. 2. The process as shown includes steps 200 through 204, and is suitable for use in the system 100 but is more generally applicable to other types of systems comprising multiple storage tiers and an associated software-defined storage controller.

In step 200, a multi-tier storage system is configured for communication over at least one network with a plurality of compute nodes. The multi-tier storage system comprises at least a front-end storage tier and a back-end storage tier. In the context of the FIG. 1 embodiment, the front-end storage tier is the fast tier 104 including server-based flash storage devices 108 while the back-end storage tier is the capacity tier 106 including object store 110. The object store 110 stores objects in association with respective unique OIDs.

In step 202, the multi-tier storage system implements at least one dispatcher node configured to load portions of graph data from the front-end storage tier and the back-end storage tier for graph analytics computations performed at respective ones of the plurality of compute nodes. The IO dispatchers 112 and 114 are examples of the dispatcher node in the FIG. 1 embodiment. Loading portions of the graph data from the front-end storage tier and the back-end storage tier may comprise utilizing raw data and application-specific graph extraction rules supplied by respective ones of the compute nodes so as to extract sub-graphs for storage in-memory on the compute nodes or in the front-end storage tier or fast tier. The sub-graphs stored in-memory on the compute nodes or in front-end storage tier overflow with nodes in the back-end storage tier or capacity tier. Thus, loading data may include periodically regenerating the sub-graphs stored in-memory on the compute nodes or in the front-end storage tier based on the progress of graph analytics at respective ones of the compute nodes. As graph analytics computations proceed, for example in a series of phases each including at least one query, different portions of the graph data may be loaded from the back-end storage tier so as to generate new sub-graphs including information needed for the queries in subsequent phases.

In step 204, logical connections of respective ones of the compute nodes to the dispatcher node are switched based on the progress of graph analytics computations at the compute nodes. The graph analytics, in some embodiments, include analytics utilizing Arbitrary Connected Graphs (ACGs). ACG analytics computations may be accelerated by utilizing fast tier storage, such as flash storage via server-based flash storage devices 108. As discussed above with respect to step 202, the dispatcher node may be designed to allow prefetching of data in the fast tier of a multi-tier storage system, using transactional IO in order to load data from a capacity tier of the multi-tier storage system. As such, it is assumed that the sub-graphs needed for a certain calculation step or phase will be in fast storage as the dispatcher node prefetches data from the capacity tier before each new transaction or ACG iteration. Further acceleration of graph analytics computations is provided using in-memory analytics on compute nodes. Such in-memory graph analytics computations may utilize Tachyon.

A challenge in performing in-memory graph analytics computations, however, is the size of the graphs. In some cases, graphs can grow up to billions of nodes and edges, even when an initial set of nodes is in the millions. As a result, it is difficult to have an entire graph in memory. Graphs, however, may be partitioned into sub-graphs. One or more sub-graphs may be allocated to one of or a group of compute nodes. Synchronization between compute nodes is used to ensure consistency of the sub-graphs. Inter-node communications, however, can be slow. While certain connections, such as RDMA over InfiniBand or Gigabit Ethernet may be used, when compute nodes need to update join edges with other nodes there is the potential for a storm of messages that will slow down computation. The logical switching of compute nodes to the dispatcher node in step 204 provides acceleration of such communication, therefore accelerating graph analytics computations.

The logical switching of connections between the compute nodes and the dispatcher node in step 204, in some embodiments, uses multiple phases to ensure that compute nodes communicate during defined intervals. These defined intervals may be used to reduce communications during computation phases.

The use of a fast tier of a multi-tier storage system, such as the flash tier in the 2 TIERS™ design, and dispatcher nodes such as IOD software, allows communication between compute nodes using direct access to the location of data in the flash tier from any of the compute nodes using IO redirect methods. When a redirect is detected, the redirect may be sent to all clients or compute nodes connected to the same dispatcher node as a collective message. Only the compute nodes that will become active connect to an IOD requester of the dispatcher node. Locality hints are used in order to bring or load data from the capacity tier of the multi-tier storage system into the fast tier of the multi-tier storage system, specifically to an IOD flash node that the interacting compute nodes are connected to.

At each phase of the graph analytics computations, the dispatcher node switches the logical connection of the compute nodes such that all communications are done only between those compute nodes logically connected to the same dispatcher node. Data is fetched and loaded into the same dispatcher node such that the compute nodes load data in memory from the closest dispatcher node in waves or phases defined by the hints of distance between graph nodes that will be stored in the memory of the dispatcher node. Advantageously, this logical switching reduces cross communication between compute nodes as the only communications needed are between compute nodes connected to the same dispatcher node. In addition, data can be fetched in memory to the compute nodes directly from a flash layer of the dispatcher node on the fast tier of the multi-tier storage system. This requires caching only the data relevant for a sub-graph and communications between compute nodes groups using the flash layer of the dispatcher node. As graph analytics computations are done in progression, the data will be fetched from the flash layer of the dispatcher node into memory of the compute nodes in waves or phases dependent on the progress of graph computations. Data location reasoning may be based on memory tables in the dispatcher node for fast data locality detection.

Dispatcher nodes may use in-memory graphs for multi-dimensional hashing indexing middleware (MDHIM) insertions, flush and persist operations. In some embodiments, only query results are persisted to flash storage in the fast tier. MDHIM insertions, flush and persist operations may be done in the memory of a dispatcher node, and when a query is finished it is persisted in flash memory of the fast tier as a final plan. The memory of the dispatcher node may be a partition of the fast tier or memory of one or more of the compute nodes, as will be explained in further detail below. Thus, in this context, the memory of the dispatcher node is considered front-end while the underlying flash storage of the fast tier is considered back-end.

Tables are built in memory after each query ends, and the tables are persisted to the flash memory of the fast tier as a wave or phase of the graph progression. By this, communications between dispatcher nodes are reduced to a minimum by redirecting the compute nodes to a correct location and changing the compute node-dispatcher node association based on changes in location. At each iteration step or phase of the graph analytics computation, a different set of compute nodes may be associated with a particular dispatcher node according to the prediction of which compute nodes will become active at the next step or phase of the graph analytics computation. When a compute node currently associated with a first dispatcher node requires data from a second dispatcher node with which that compute node is not currently associated, the compute node will be redirected to access the data on the second dispatcher node and in-memory tables of the first and second dispatcher nodes will be updated to reflect the change in association.

In some embodiments, hashing is used to reduce communications to cases where inserts, overflow and the communication includes all the changes in a time slot or transaction. Storage nodes should generally not communicate directly except for table updates using MDHIM.

Figure 2:
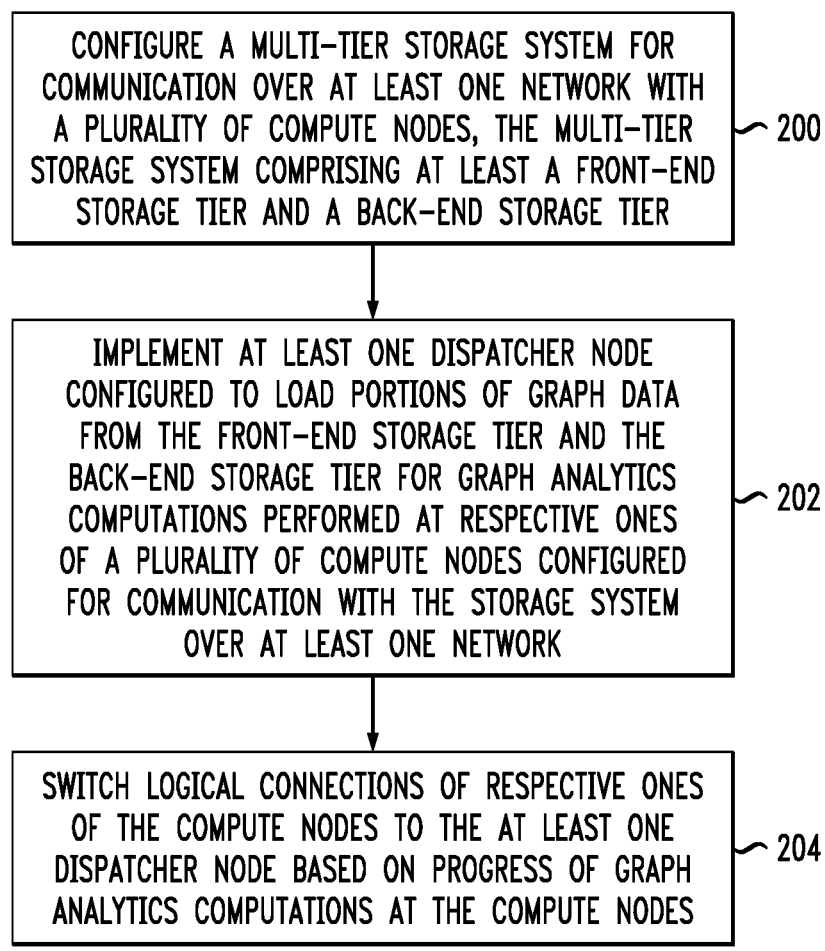
FIG. 2 is a flow diagram of an exemplary process for efficient graph analytics computations in the information processing system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations for efficient graph analytics computations in a multi-tier storage system. For example, the ordering of the process steps may be varied in other embodiments, or certain steps may be performed concurrently with one another rather than serially. Also, one or more of the process steps may be repeated periodically, or multiple instances of the process can be performed in parallel with one another in order to implement a plurality of different dispatcher nodes within a given information processing system.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments of information processing systems comprising compute nodes and a multi-tier storage system will now be described with reference to FIGS. 3 through 9.

Figure 3:
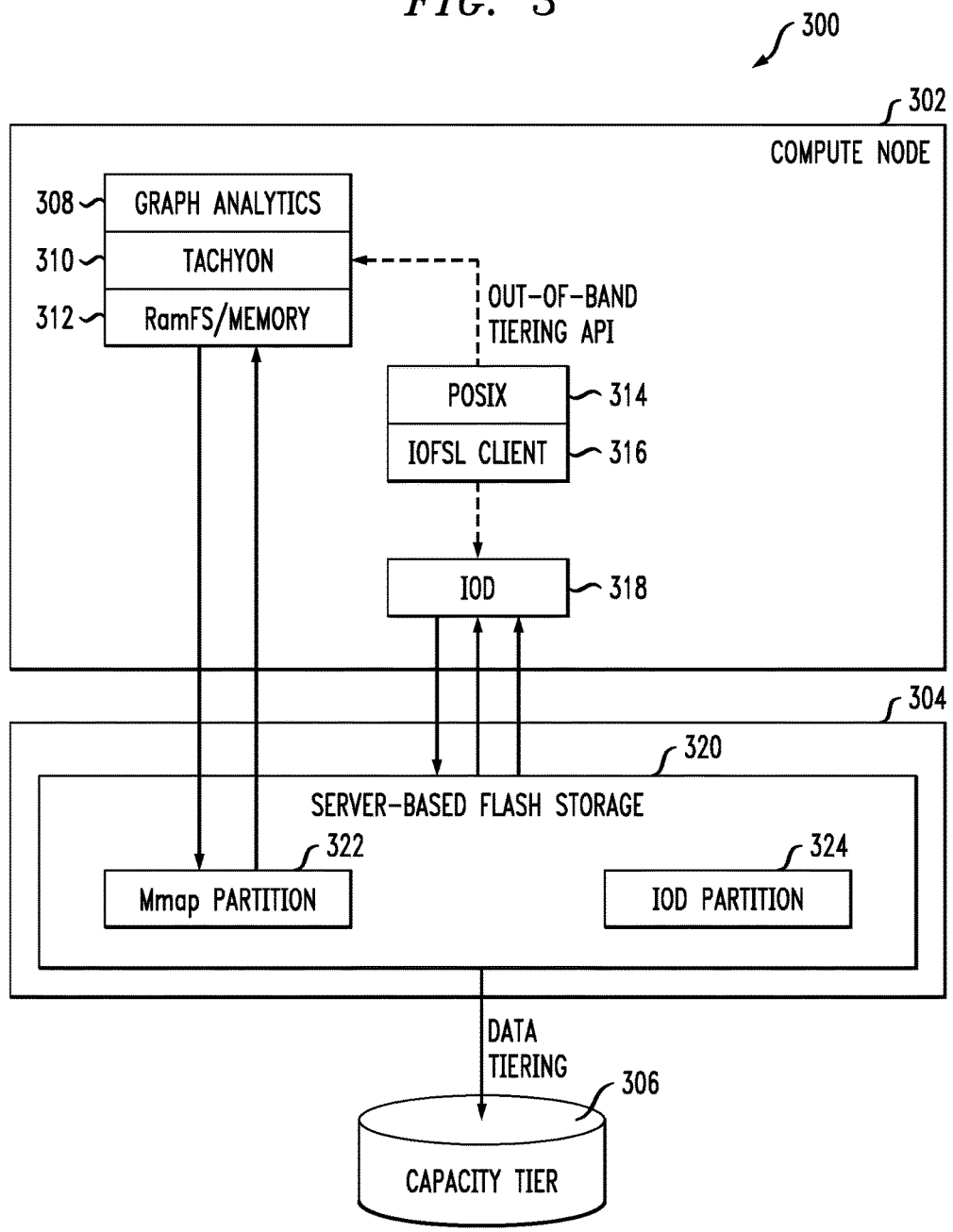
FIGS. 3 through 9 show respective additional illustrative embodiments of information processing systems comprising multi-tier storage systems facilitating efficient graph analytics computations.

Referring now to FIG. 3, an information processing system 300 comprises compute node 302, a fast tier 304 and a capacity tier 306. Compute node 302 comprises a graph analytics application 308, Tachyon in-memory analytics 310 and RamFS/memory 312. RamFS is a simple file system that exports Linux's disk caching mechanisms such as page cache and dentry cache as a dynamically resizable RAM-based filesystem.

The compute node 302 further includes Portable Operating System Interface (POSIX) 314 interface to an I/O Forwarding Scalability Layer (IOFSL) client 316, which collectively implement an out-of-band tiering application programming interface (API). POSIX 314 provides a set of standard operating system interfaces including APIs, command line shells and utility interfaces to provide software compatibility among different operating systems. IOFSL provides a scalable I/O forwarding software layer.

The fast tier 304 includes server-based flash storage 320, mmap partition 322, and IOD partition 324. The mmap partition 320 and IOD partition 324 may be implemented via the server-based flash storage 320. Mmap is a POSIX-compliant Unix system call for mapping files or devices into memory, providing memory-mapped file I/O. The server-based flash storage 320 is connected to compute node 302, and used as a mmap flash via mmap partition 322 or a memory extension or replacement for Tachyon 310. In the FIG. 3 embodiment, Tachyon 310 utilizes the server-based flash storage 320 as its memory tier, and the out-of-band IOD 318 does only tiering. The FIG. 3 embodiment may be referred to as a Graph-in-Memory-DSSD configuration.

Computations by compute node 302 may be done directly on the local memory filesystem, RamFS/memory 312. Data is loaded into RamFS/memory 312 using POSIX 314 and IOFSL client 316 from the IOD 318 using 2 Tiers™ architecture, where the server-based flash storage 320 comprises DSSD™ devices. In the FIG. 3 embodiment, Tachyon 310 utilizes server-based flash storage 320 as a fast memory while data is tiered directly from server-based flash storage 320 to the capacity tier 306 out-of-band. For example, ACG writes or loads a sub-graph into Tachyon 310 by mapping data from server-based flash storage 320 directly connected to the compute node 302. IOD 318 will also access server-based flash storage 320 and copy data between the capacity tier 306 and the server-based flash storage 320 of fast tier 304. At a next step or phase of graph analytics computations, the data will be available to Tachyon 310 and graph analytics 308 of the compute node 302 that will compute the next step or phase sub-graph, as the data is in the mmap partition 322 of server-based flash storage 320. The memory 312 of compute node 302 is fed using Peripheral Component Interconnect Express (PCIe) access, where the data is copied automatically to the RamFS/memory 312 using mmap to PCIe from server-based flash storage 320.

There is no direct request by the graph analytics 308 needed in the FIG. 3 embodiment—the data is accessible via server-based flash storage 320 where the IOD 318 does the tiering out-of-band. There is also no need for communication between the compute node 302 and one or more other compute nodes not explicitly shown in FIG. 3, as the data needed for next iterations, step or phases of graph analytics computations is placed in the RamFS/memory 312 seamlessly based on predictions without requiring redirects.

In some embodiments, IOD data may be loaded from the capacity tier 306 to server-based flash storage 320, where the IOD 318 remaps new filesystem data blocks to the mmap partition 322 of server-based flash storage 320 instead of using Tachyon 310 to move data from disk or file system in user space (FUSE) to memory.

The capacity tier 306 may be implemented using a ViPR® software-defined storage controller, although other types of controllers could be used. In some embodiments, the software-defined storage controller is implemented in a distributed manner utilizing a plurality of software-defined storage modules implemented on respective storage nodes forming the capacity tier 106.

Figure 4:
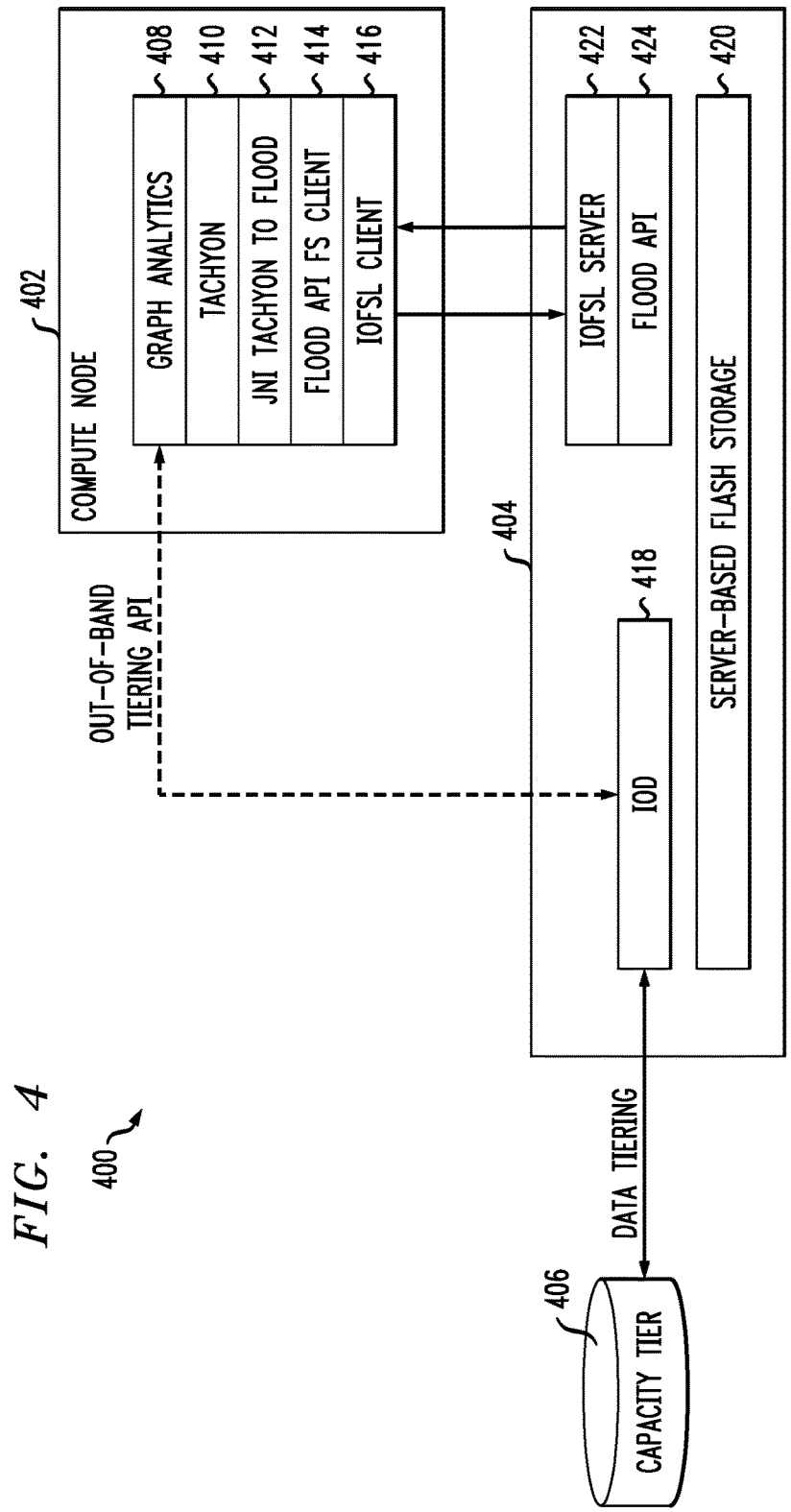

FIG. 4 shows another embodiment of an information processing system 400 comprising compute node 402, fast tier 404 and capacity tier 406. The compute node 402 includes graph analytics application 408, Tachyon in-memory analytics 410, a Java™ Native Interface (JNI) Tachyon to Flood module 412, a Flood API FS client 414 and an IOFSL client 416. Fast tier 404 includes IOD 418, server-based flash storage 420, IOFSL server 422 and Flood API 424. In the FIG. 4 embodiment, Tachyon 410 again uses server-based flash storage 420 as its memory tier, but IOFSL client 416 exports Flood API 424 to modified applications such as modified Tachyon 410. The FIG. 4 embodiment may be referred to as a Graph-Flood API-IOFSL configuration.

Tachyon 410 is modified to access server-based flash storage 420 via Flood API calls forwarded to the server-based flash storage 420 using IOFSL via IOFSL client 416, IOFSL server 422 and Flood API 424. Tachyon 410 utilizes server-based flash storage 420 as a replacement for memory and uses ObjectStore for analytics. Graph analytics application 408 asks to move data chunks from capacity tier 406 to server-based flash storage 420 of fast tier 404. The IOD 418 still controls tiering via an out-of-band tiering API. In this case, there is no need for the graph analytics application 408 to copy data from FUSE/IOFSL as IOD 418 can access the data and copy it to allow Tachyon 410 to access it. IOD 418 sends offsets of where data is, and the data is accessed via a PCIe interface. The information processing system 400 may utilize forward POSIX with ZoidFS or forward object for storage.

In the information processing system 400, the compute node 402 accesses data on server-based flash storage 420 in place, and the only signaling needed is done by the IOD 418 redirecting IO requests to the right compute node that will need to access the data in memory. The compute nodes, such as compute node 402, still need to feed the data in to its memory as the data is not automatically fed.

Similar to information processing system 300, the fast tier 404 and capacity tier 406 may be implemented as a 2 TIERS™ storage system where the server-based flash storage 420 is implemented using DSSD™ server-based flash storage devices. The capacity tier 406 may be implemented using ViPR® software-defined storage, possibly using storage controllers implemented in a distributed manner.

Figure 5:
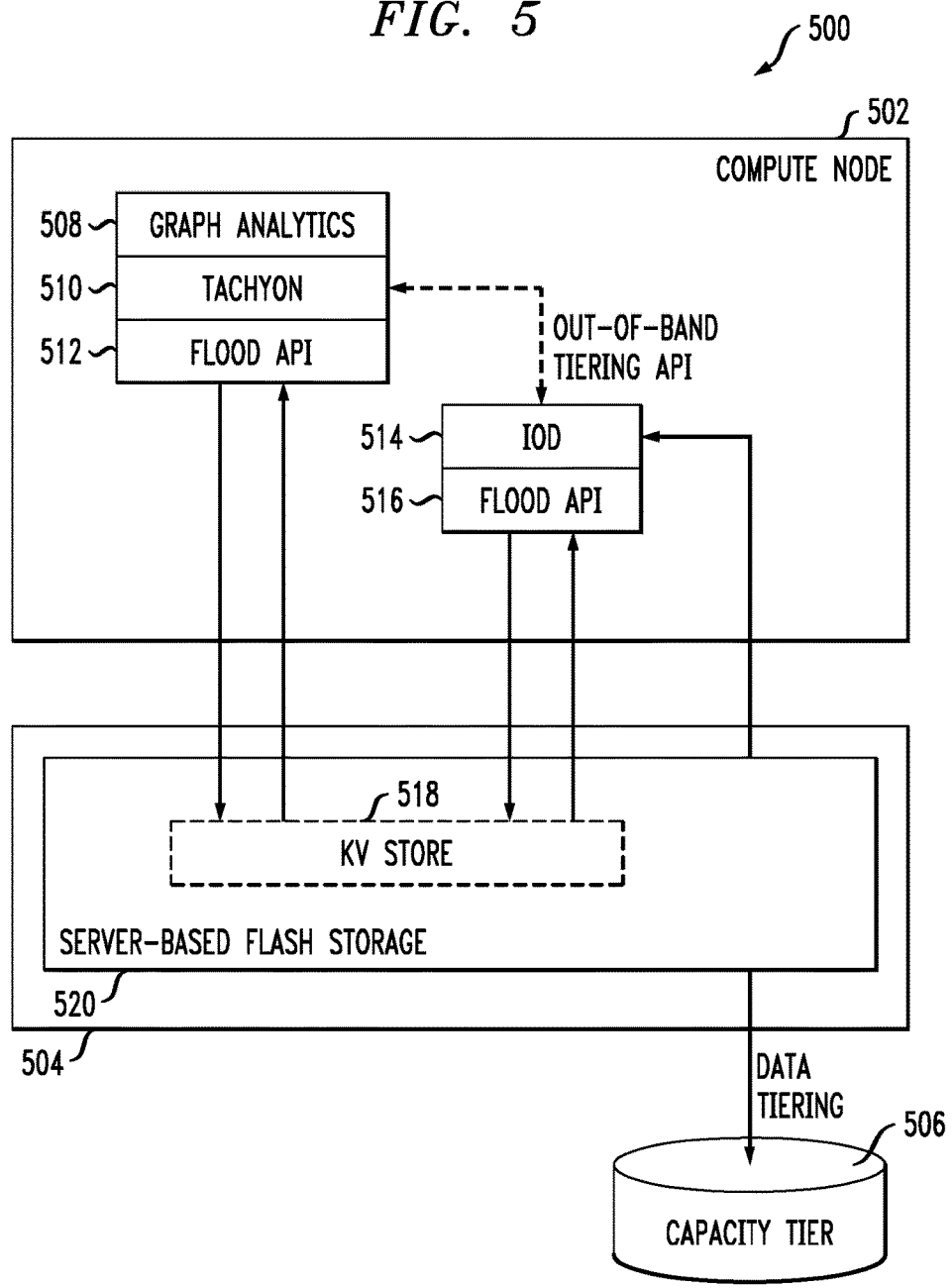

Another embodiment is shown in FIG. 5, where information processing system 500 comprises compute node 502, fast tier 504 and capacity tier 506. Compute node 502 comprises graph analytics application 508, Tachyon in-memory analytics 510, Flood API 512, IOD 514 and Flood API 516. Fast tier 504 includes server-based flash storage 520, which may implement a Key-Value (KV) store 518. In the FIG. 5 embodiment, Tachyon 510 again uses server-based flash storage 520 as its memory tier and is similar to the Graph-Flood API-IOFSL configuration of information processing system 400, with the exception that there is no IOFSL involved in the IO path and data is accessed directly by compute nodes such as compute node 502 from server-based flash storage 520. The compute nodes and IODs access server-based flash storage 520 via KV store 518, where IOD 514 controls tiering and maps data to the compute node 502. The FIG. 5 embodiment may be referred to as a Graph-Flood API-PCIe configuration.

Graph analytics application 508 controls data movement between tiers but the compute node 502 will access, via PCIe, the KV store 518 on server-based flash storage 520. IOD 514 moves objects from server-based flash storage 520 to objects on the capacity tier 506 and performs translation. The Tachyon-Flood API-PCIe configuration replaces RDMA with faster PCIe, but requires the IOD 514 to translate and will be limited by the number of hosts connected to server-based flash storage 520. Scaling to multiple server-based flash storage devices presents a challenge in this configuration, although the IOD 514 allows for extending to more server-based flash storage devices, possibly using MDHIM.

Similar to information processing system 300, the fast tier 504 and capacity tier 506 may be implemented as a 2 TIERS™ storage system where the server-based flash storage 520 is implemented using DSSD™ server-based flash storage devices. The capacity tier 506 may be implemented using ViPR® software-defined storage, possibly using storage controllers implemented in a distributed manner.

Figure 6:
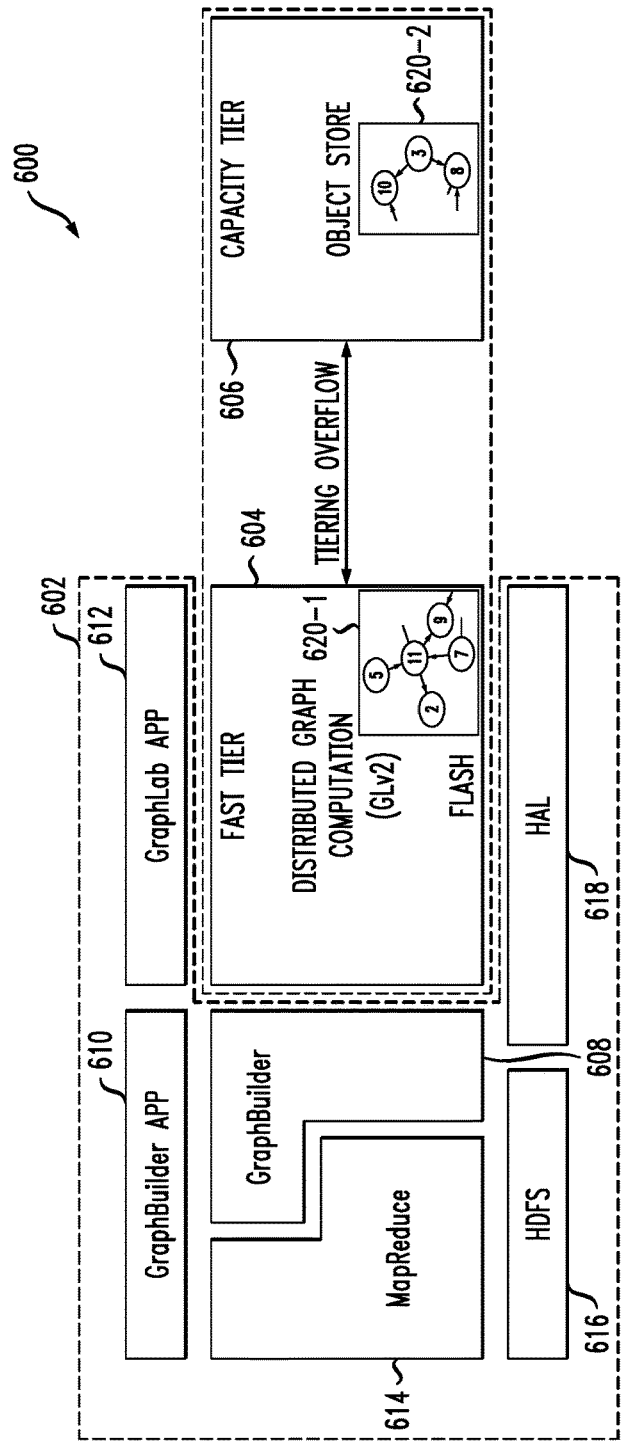

FIG. 6 shows an information processing system 600 including compute node 602, fast tier 604 and capacity tier 606. In FIG. 6, a software stack of compute node 602 is shown, along with overflow to an object store of capacity tier 606. The software stack of compute node 602 includes GraphBuilder 608, along with a GraphBuilder application 610 and a GraphLab application 612. GraphBuilder 608, GraphBuilder application 610 and GraphLab application 612 are examples of graph analytics applications described elsewhere herein. In particular, GraphBuilder may be used to create a graph from raw data using MapReduce 614 tasks for extraction, normalization, checks and transformation, partitioning, serialization, etc. to write graph-specific formats into Hadoop® File System (HDFS) 616. GraphLab provides a graph-based distributed computation framework. Various portions of the software stack utilize Hardware Abstraction Layer (HAL) 618.

As shown in FIG. 6, compute node 602 utilizes fast tier 604 to perform distributed graph computations, e.g., GLv2. The fast tier 604 stores sub-graph 620-1 used for the GLv2 computations at compute node 602. Tiering and overflow are provided between the fast tier 604 and capacity tier 606. Thus, as shown sub-graph 620-1 has nodes and edges which overflow with sub-graph 620-2 on an object store of capacity tier 606.

Figure 7:
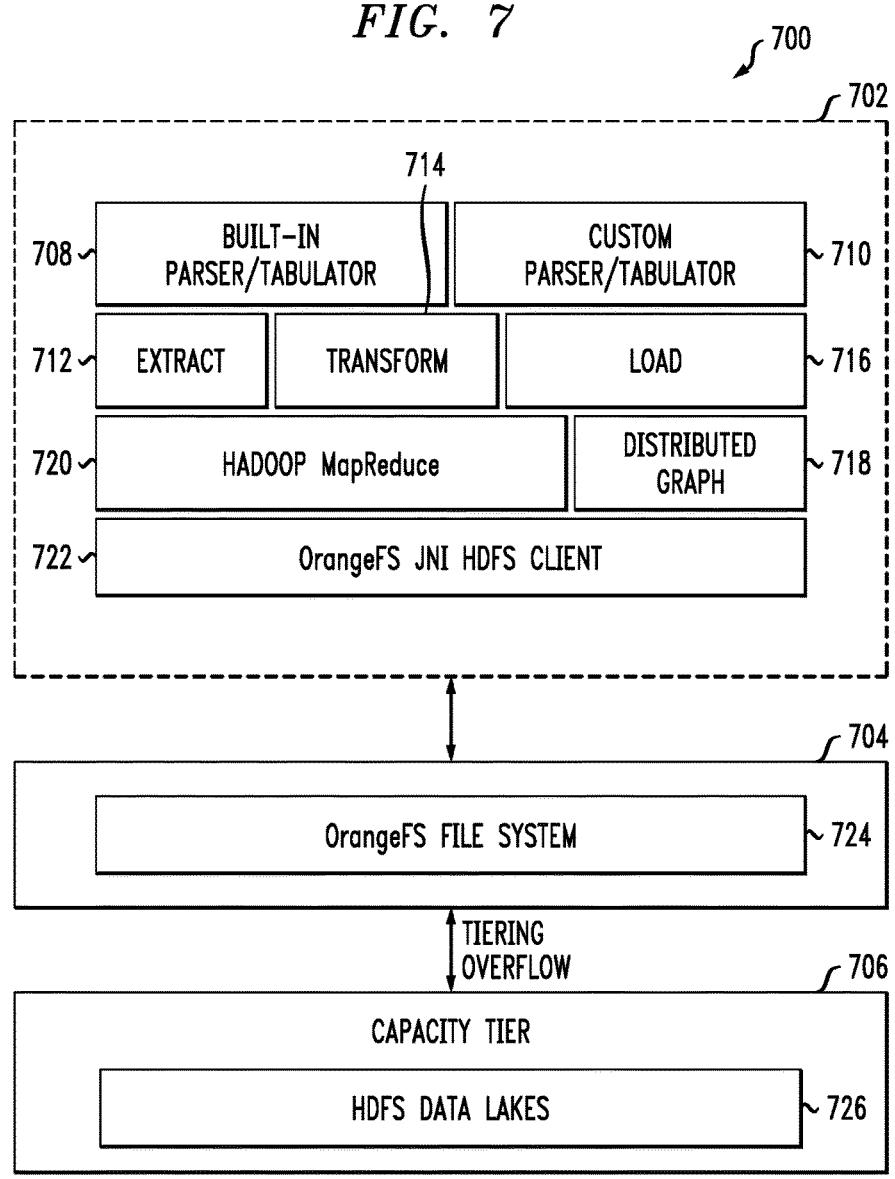

Another embodiment is shown in FIG. 7. In this embodiment, information processing system 700 includes compute node 702, fast tier 704 and capacity tier 706. FIG. 7 illustrates overflow on HDFS in a GraphBuilder architecture. Compute node 702 comprises a built-in parser/tabulator 708 and a custom parser/tabulator 710, along with extract 712, transform 714 and load 716 modules and distributed graph application 718. Extract module 712 provides for feature extraction, graph formation and tabulation. Transform module 714 provides for graph transformation, checks and normalization. Load module 716 provides for graph partitioning and serialization. The GraphBuilder framework shown in FIG. 7 utilizes and supports both built-in parser/tabulator 708 and custom parser/tabulator 710, permitting extension of the framework to application-specific parsers for extraction of features from data sources as well as tabulation of such features. Hadoop® MapReduce 720 provides map and reduce tasks for defining edges and vertices and building graphs.

OrangeFS JNI HDFS client 722 is used by the compute node 702 to interface with OrangeFS file system 724 on capacity tier 704. Tiering and overflow operations are performed between the fast tier 704 and capacity tier 706. As shown in FIG. 7, the capacity tier 706 includes HDFS data lakes 726 for storing overflow data.

Figure 8:
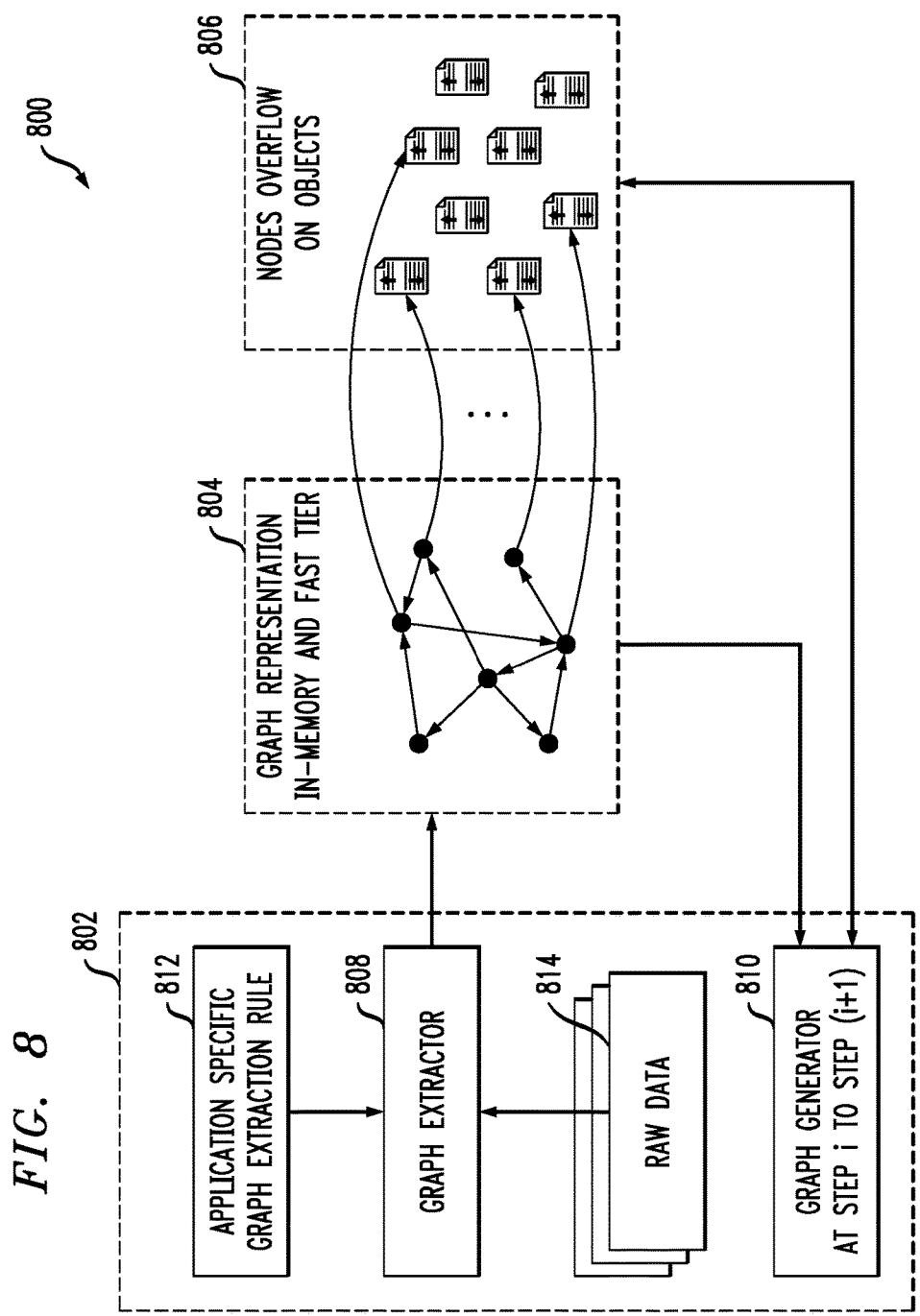

FIG. 8 shows an information processing system 800, including compute node 802, fast tier 804 and capacity tier 806. The compute node 802 comprises a graph extractor module 808 and a graph generator module 810, which collectively form at least a portion of one or more graph analytics applications. The graph extractor 808 receives application-specific graph extraction rules 812 along with raw data 814. Although FIG. 8 shows the application specific graph extraction rules 812 and raw data 814 as elements internal to the compute node 802, the application specific graph extraction rules 812 and raw data 814 may be received from one or more external sources. As an example, the application specific graph extraction rules 812 may be received by a social networking application, which defines relations or links and edges between nodes for graph data.

The graph extractor 808 and graph generator 810 utilize the application specific graph extraction rules 812 to generate edges connecting graph vertices, as well as to update the weights of edges updated by propagation from previous iterations or phases of graph analytics computations. This is illustrated in FIG. 8, where the graph generator 810 updates graph representations in capacity tier 804 at step i to step (i+1). Although FIG. 8 specifically shows a sub-graph on fast tier 804, the sub-graph or a portion thereof may also be stored in-memory on compute node 802. The capacity tier 806 stores additional overflow data in an object store as shown.

Figure 9:
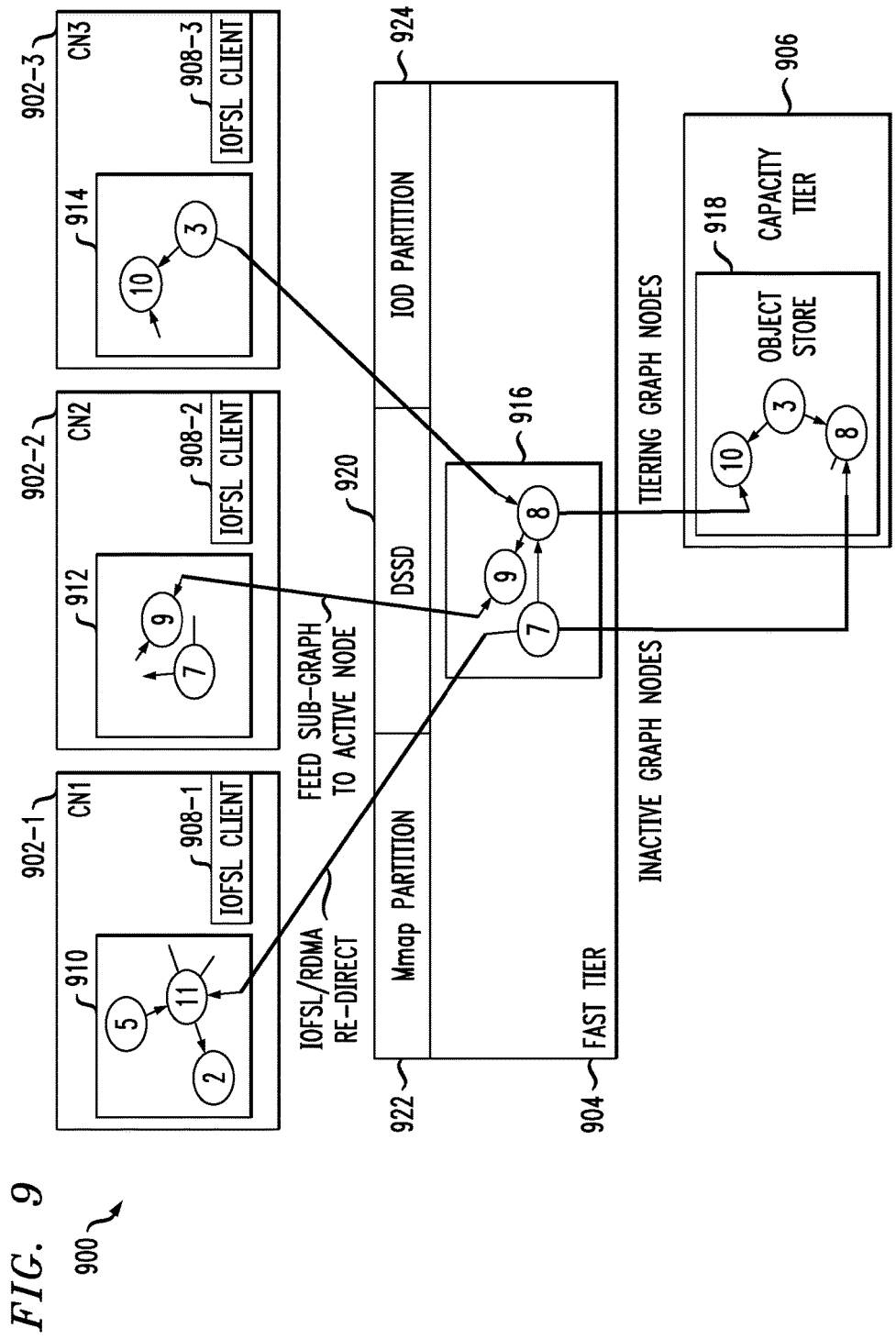

Another embodiment is shown in FIG. 9. In this embodiment information processing system 900 includes compute nodes 902-1, 902-2 and 902-3, fast tier 904 and capacity tier 906. The compute nodes 902-1, 902-2 and 902-3 are also referred to as CN1, CN2 and CN3, respectively. Each of CN1, CN2 and CN3 implements a respective IOFSL client 908. CN1, CN2, CN3, fast tier 904 and capacity tier 906 each also store a portion of graph data including one or more nodes and edges connecting those nodes. CN1 stores sub-graph 910 in-memory, CN2 stores sub-graph 912 in-memory, CN3 stores sub-graph 914 in-memory, fast tier 904 stores sub-graph 916 and capacity tier 906 stores sub-graph 918.

The fast tier 904 and capacity tier 906 are illustratively implemented as a 2 TIERS™ storage system where the fast tier comprises DSSD™ server-based flash storage devices 920. It is to be appreciated, however, that in other embodiments other types of server-based flash storage may be used in place of or in addition to DSSD™ server-based flash storage devices.

The sub-graph 916 is stored on DSSD™ devices 920 of fast tier 904, and is accessible to each of CN1, CN2 and CN3. The sub-graph 918 on capacity tier 906 includes inactive graph nodes in an object store. The inactive graph nodes of sub-graph 918 may include one or more graph nodes and edges which are not needed in a current phase or step of graph analytics computations performed on CN1, CN2 and CN3.

The fast tier 904, similar to fast tier 304 in information processing system 300, includes mmap partition 922 and IOD partition 924. Each of the mmap partition 922 and IOD partition 924 may be implemented via the DSSD™ devices 920. The mmap partition 922 may be used as mmap flash or a memory extension or replacement for memory in CN1, CN2 and/or CN3.

The fast tier 904, which may implement an IOD not specifically shown in FIG. 9, utilizes IOFSL/RDMA redirects to connect CN1, CN2 and CN3 to the DSSD™ devices 920. Such redirects are an example of switching logical connections of CN1, CN2 and CN3 to a dispatcher node or IOD implemented at least in part utilizing fast tier 904. The fast tier 904 also feeds sub-graphs, such as sub-graph 910, 912 and 914, to the active compute nodes CN1, CN2 and CN3. The DSSD™ devices 920 of fast tier 904 additionally store sub-graph 916, which as mentioned above is accessible by CN1, CN2 and CN3. Graph nodes are tiered to the DSSD™ devices 920 of fast tier 904 from the object store of capacity tier 906.

It should be understood that the particular compute node, fast tier and capacity tier configurations illustrated in FIGS. 3 through 9 are presented by way of illustrative example only, and should not be construed as limiting in any way. Numerous alternative configurations of compute nodes, fast tiers, capacity tiers and more generally multi-tier storage systems or other system elements can be used in other embodiments. By way of example, while various filesystems, APIs, graph analytics applications, storage devices, etc. are shown as being used in different ones of the configurations in FIGS. 3 through 9, various other types of filesystems, APIs, graph analytics applications, storage devices, etc. may be used in other embodiments.

Illustrative embodiments disclosed herein can provide a number of significant advantages relative to conventional arrangements.

For example, one or more embodiments provide enhanced data access performance and scalability for graph analytics computations in multi-tier storage systems. Thus, some embodiments permit real-time data analysis in areas such as big data analytics, Internet of Things (IoT), social networking, biosciences, etc.

Big data analytics continues to grow as a tool used in various aspects of modern life. Such aspects range from business, security, IoT and many other areas. One advanced analytic engine is graph analytics, which may be used in social media applications to sort relations between individuals, in biosciences genomic applications, by IoT applications, etc. Some embodiments enable the use of Tachyon for efficient in-memory graph analytics. In a multi-tier storage system, graph analytics may be accelerated using in-memory graph analytics where data is waved or phased to memory from the fast tier and to the fast tier from the capacity tier. In such embodiments, graph analytics may be performed at the speed of the memory of compute nodes, and communications between compute nodes are managed by waving or phasing the data in memory when leafs of graphs overflow to storage in the fast tier and capacity tier. Due to graph data's ability to be partitioned into sub-graphs, the data may be waved or loaded into the memory of different compute nodes on request.

Graph analytics computations may operate on very large data sets. In some cases, the numbers of graph nodes and edges can grow to unpredictable very large numbers which are difficult or impossible to store or provision in memory of compute nodes or a fast tier of a multi-tier storage system. Graphs, however, can be partitioned into smaller sub-graphs which may be held in memory at a compute node or in a fast tier of a multi-tier storage system. The need to propagate data in graph edges to other nodes, however, can lead to a storm of communication that slows down graph analytics computations which would otherwise be performed very fast using the in-memory data at different compute nodes.

In addition, as graph analytics computations progress, the compute nodes require access to different portions of the graph data. In some cases, the sub-graph stored in the memory of a compute node does not include data needed for a next step in graph analytics computations. Thus, systems need to identify which compute nodes will become active and feed the needed data to the memory of the correct compute node. The needed data, however, may not be known until a previous step of the graph analytics computation is completed. Thus, it is difficult to predict which compute nodes will become active in a next computation step and thus computation is delayed. The techniques described above overcome these and other disadvantages associated with conventional graph analytics computations.

Described below are two exemplary use cases for graph analytics which may benefit from the use of efficient graph analytics computations described herein. It is to be appreciated, however, that embodiments are not limited solely to the specific use cases identified below. Various other use cases are possible, including but not limited to, big data analytics and real-time data analysis for IoT.

Large numbers of people utilize social networking as a means to stay in touch with other persons and their communities. Sometimes, however, it can take a few days for a given user to get updates from certain other users not connected to the given user. One reason for this delay is that graph analytics engines must calculate all connections for the given user's tree and detect all links for the graph, which is built each time from a previous graph. With the use of in-memory graph analytics in a multi-tier storage system such as 2 TIERS™, all the sub-graph of the given user can be kept in memory of few nodes or at most in memory and in flash storage on a dispatcher node. But in order to build the temporary graph with all the connections in the graph, a new graph needs to be generated which can dynamically change as new users view a certain page and it can take a long time to get the posts of all connected to the given user. If the posts are only related to a first level of connections for the given user, the update is very fast. As an example, when the given user likes a post the given user may automatically get all the posts of close friends that have posted on related topics. It can take days, however, until the given user receives related posts from users outside the circle of close friends. The use of in-memory graph analytics can accelerate this process by orders of magnitude, as computations can all be done in-memory. Tachyon, for example, may be used to store graph nodes of the circle of close friends and use a cluster of nodes to calculate propagation of a post.

In some conventional arrangements, biosciences analytics such as the search for genes in the human genome may be done using NoSQL database computations. Such biosciences analytics, including the search for genes and detection of mutations may be accelerated using graph analytics. Graph analytics is a promising solution for such biosciences analytics, as the genome can grow with additional leafs each time a new gene is discovered. Current attempts are relatively slow due to the traditional database computations used for in-memory analytics, such as SAP HANA for SQL databases. Graph analytics computations using various techniques described herein offer speed advantages relative to traditional database computations, permitting faster computations and searches.

It is to be appreciated that the particular advantages described above are associated with particular illustrative embodiments and need not be present in other embodiments.

Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as compute nodes 102, or portions thereof, can be implemented as respective tenants of such a multi-tenant environment.

Back-end storage of a given system disclosed herein can also be implemented at least in part utilizing cloud infrastructure. Examples of cloud-based object stores that can be utilized for back-end storage in some illustrative embodiments include Amazon Web Services (AWS), Simple Storage Service (S3), Google Cloud Platform (GCP) Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system 100, although in other embodiments a given tenant can have multiple containers. The containers may be utilized to implement a variety of different types of functionality within the system 100. For example, containers can be used to implement respective compute nodes or cloud storage nodes of a cloud computing and storage system. The compute nodes or storage nodes may be associated with respective cloud tenants of a multi-tenant environment of system 100. Containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of compute nodes 102, fast tier 104, capacity tier 106, IO dispatchers 112 and 114 and data mover modules 116 are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, compute nodes, storage tiers, IO dispatchers, data mover modules and associated storage devices. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a multi-tier storage system comprising at least a front-end storage tier and a back-end storage tier; and
at least one dispatcher node implemented on at least one processing device comprising a processor coupled to a memory, the at least one dispatcher node configured to load portions of graph data from the front-end storage tier and the back-end storage tier for graph analytics computations performed at respective ones of a plurality of compute nodes configured for communication with the storage system over at least one network;
wherein the multi-tier storage system is configured to switch logical connections of respective ones of the compute nodes to the at least one dispatcher node based on progress of graph analytics computations at the compute nodes.

2. The apparatus of claim 1 wherein the front-end storage tier comprises a fast tier having a relatively high input-output processing speed and a relatively low capacity and the back-end storage tier comprises a capacity tier having a relatively low input-output processing speed and a relatively high capacity.

3. The apparatus of claim 2 wherein the storage system further comprises one or more data mover modules configured to move data between the front-end storage tier and the back-end storage tier.

4. The apparatus of claim 2 wherein the front-end storage tier comprises at least one server-based flash storage device and the back-end storage tier comprises at least one object store configured to store data in the form of objects having respective object identifiers.

5. The apparatus of claim 2 wherein the at least one dispatcher node is implemented as an additional tier of the multi-tier storage system above the front-end storage tier of the multi-tier storage system.

6. The apparatus of claim 1 wherein the at least one dispatcher node is implemented at least partially within a given one of the compute nodes, the at least one dispatcher node being configured to load data into a memory of the given compute node from at least one of the front-end storage tier and the back-end storage tier.

7. The apparatus of claim 1 wherein the at least one dispatcher node is implemented at least partially within the front-end storage tier of the multi-tier storage system, the at least one dispatcher node being configured to load data into the front-end storage tier from the back-end storage tier.

8. The apparatus of claim 1 wherein the compute nodes logically connected to the same dispatcher node are configured to communicate with one another while compute nodes logically connected to different dispatcher nodes are not configured to communicate with one another.

9. The apparatus of claim 8 wherein the compute nodes logically connected to the same dispatcher node are configured to communicate with one another using remote direct memory access connections.

10. The apparatus of claim 1 wherein the at least one dispatcher node comprises a flash memory configured to store a sub-graph of graph data, the sub-graph being based on the progress of graph analytics computations by compute nodes logically connected to the at least one dispatcher node.

11. The apparatus of claim 10 wherein the multi-tier storage system is configured to switch the logical connections of respective ones of the compute nodes based on hints of distance between graph nodes of the sub-graph stored in the flash memory of the at least one dispatcher node.

12. The apparatus of claim 1 wherein the graph analytics computations comprise a series of phases with each phase comprising at least one query.

13. The apparatus of claim 12 wherein the at least one dispatcher node is configured to build one or more tables for data locality detection after each query ends, the one or more tables being persisted to a flash memory of the at least one dispatcher node and utilized to predict which compute nodes will become active in a next phase.

14. The apparatus of claim 13 wherein the at least one dispatcher node utilizes the predictions to logically connect different subsets of the compute nodes to the at least one dispatcher node for each phase.

15. The apparatus of claim 1 wherein the at least one dispatcher node utilizes in-memory graphs for multi-dimensional hashing indexing middleware (MDHIM) insertions, flush and persist operations.

16. The apparatus of claim 1 wherein the multi-tier storage system and the at least one dispatcher node are part of an information processing system.

17. A method comprising:
configuring a multi-tier storage system for communication over at least one network with a plurality of compute nodes, the multi-tier storage system comprising at least a front-end storage tier and a back-end storage tier;
implementing at least one dispatcher node configured to load portions of graph data from the front-end storage tier and the back-end storage tier for graph analytics computations performed at respective ones of a plurality of compute nodes configured for communication with the storage system over at least one network; and
switching logical connections of respective ones of the compute nodes to the at least one dispatcher node based on progress of graph analytics computations at the compute nodes;
wherein the method is performed using at least one processing device comprising a processor coupled to a memory.

18. The method of claim 17 wherein:
the graph analytics computations proceed in a series of phases each comprising at least one query;
monitoring the progress of the graph analytics computations comprises building one or more tables for data locality detection after each query ends, the one or more tables being persisted to a flash memory of the at least one dispatcher node and utilized to predict which compute nodes will become active in a next phase; and
switching logical connections of respective ones of the compute nodes comprises utilizing the predictions to logically connect different subset of the compute nodes to the at least one dispatcher node for each phase.

19. A non-transitory processor-readable storage medium having stored therein program code of one or more software programs, wherein the program code when executed by at least one processing device causes said processing device:
to configure a multi-tier storage system for communication over at least one network with a plurality of compute nodes, the multi-tier storage system comprising at least a front-end storage tier and a back-end storage tier;
to implement at least one dispatcher node configured to load portions of graph data from the front-end storage tier and the back-end storage tier for graph analytics computations performed at respective ones of a plurality of compute nodes configured for communication with the storage system over at least one network; and
to switch logical connections of respective ones of the compute nodes to the at least one dispatcher node based on progress of graph analytics computations at the compute nodes.

20. The non-transitory processor-readable storage medium of claim 19 wherein:
the graph analytics computations proceed in a series of phases each comprising at least one query;
monitoring the progress of the graph analytics computations comprises building one or more tables for data locality detection after each query ends, the one or more tables being persisted to a flash memory of the at least one dispatcher node and utilized to predict which compute nodes will become active in a next phase; and
switching logical connections of respective ones of the compute nodes comprises utilizing the predictions to logically connect different subset of the compute nodes to the at least one dispatcher node for each phase.

\* \* \* \* \*

UNITED STATES PATENT AND TRADEMARK OFFICE
CERTIFICATE OF CORRECTION

PATENT NO. : 9,960,973 B1
APPLICATION NO. : 14/977960
DATED : May 1, 2018
INVENTOR(S) : Sorin Faibish et al.

Page 1 of 1

It is certified that error appears in the above-identified patent and that said Letters Patent is hereby corrected as shown below:

In the Specification

Column 1, Line 17 please delete "TO" and replace it with --IO--

Column 4, Line 17 please delete "TO" and replace it with --IO--

Column 4, Line 57 please delete "TO" and replace it with --IO--

Signed and Sealed this
Nineteenth Day of June, 2018

Andrei Iancu
*Director of the United States Patent and Trademark Office*